United States Patent
Tanaka et al.

(10) Patent No.: US 6,509,942 B2
(45) Date of Patent: Jan. 21, 2003

(54) LIQUID CRYSTAL DISPLAY DEVICE, WIRING SUBSTRATE, AND METHODS FOR FABRICATING THE SAME

(75) Inventors: Naoyuki Tanaka, Mie (JP); Masaya Takayama, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/766,592

(22) Filed: Jan. 23, 2001

(65) Prior Publication Data

US 2001/0015781 A1 Aug. 23, 2001

(30) Foreign Application Priority Data

Jan. 26, 2000 (JP) ........................................ 2000-016680
Dec. 14, 2000 (JP) ........................................ 2000-380526

(51) Int. Cl.[7] .......................................... G02F 1/1333
(52) U.S. Cl. ...................... 349/113; 349/143; 349/147
(58) Field of Search ............................ 349/42, 43, 113, 349/142, 143, 147

(56) References Cited

U.S. PATENT DOCUMENTS 5,543,946 A * 8/1996 Enomoto et al. ............. 359/87
6,226,060 B1 * 5/2000 Onisawa et al. ............... 349/43
6,078,365 A * 6/2000 Ueda et al. .................... 349/43
6,184,960 B1 * 2/2001 Sawayama et al. ......... 349/139
6,195,140 B1 * 2/2001 Kubo et al. .................... 349/44
6,231,939 B1 * 5/2001 Shaw et al. ................ 428/35.9

FOREIGN PATENT DOCUMENTS

JP             406053408 A  *  2/1994

* cited by examiner

Primary Examiner—Toan Ton
Assistant Examiner—Hoan Nguyen
(74) Attorney, Agent, or Firm—Nixon & Vanderhye P.C.

(57) ABSTRACT

The liquid crystal display device (100) of the present invention includes a reflection electrode (12) on a base substrate (10). The reflection electrode (12) has a double-layer structure of a first metal layer (16) containing Mo and a second metal layer (14) containing Al formed on the first metal layer (16). By forming the first metal layer (16) so that the maximum grain size of Mo at the surface is 60 nm or less, generation of pinholes in the second metal layer (14) is suppressed. This suppresses/prevents occurrence of partial loss of the second metal layer (14) at positions surrounding the pinholes in a process such as removal of a resist pattern with an alkaline remover.

22 Claims, 10 Drawing Sheets

LIQUID CRYSTAL DISPLAY DEVICE, WIRING SUBSTRATE, AND METHODS FOR FABRICATING THE SAME

BACKGROUND OF THE INVENTION

The present invention relates to a liquid crystal display device, a wiring substrate, and methods for fabricating the liquid crystal display device and the wiring substrate. More particularly, the present invention relates to a liquid crystal display device capable of realizing reflection-mode display by use of ambient light, and a method for fabricating such a liquid crystal display device.

In recent years, rapid progress has been made in the field of application of liquid crystal display (LCD) devices to wordprocessors, laptop computers, pocket TV sets, and the like. Among the LCD devices, a reflection type LCD device capable of realizing display by reflecting ambient light, in particular, has attracted attention for its possibility of reducing the power consumption, the thickness, and the weight taking advantage of requiring no backlight. Nowadays, also, there has been developed a dual-mode LCD device that can realize display in both reflection and transmission modes.

Conventionally, in LCD devices, a reflector or a reflection layer for reflecting ambient light was placed on the outer surface of a substrate (a TFT substrate or a substrate located farther from the viewer). However, as the pixel size becomes smaller with increase in the capacity of the LCD devices, this construction arises the following problem. That is, parallax is generated due to the difference in distance from a color filter (pixel portion) and the reflector (reflection layer), and this deteriorates display quality.

In order to solve the above problem, the construction of placing a reflection layer on the surface of a substrate facing a liquid crystal layer has become widely used. In this construction, also, the reflection layer itself is used as an electrode for applying a voltage to the liquid crystal layer (for example, as a pixel electrode in an LCD device using TFTs). As the material for the reflection layer, aluminum (Al) (and an Al alloy) is often used since Al is high in reflectance, easily patterned, and low in electric resistance.

It is known that when an ITO layer and an Al layer are put in contact with each other and together exposed to an alkaline solution, galvanic corrosion occurs between ITO and Al, resulting in partial loss of the ITO layer and the Al layer. Note that in the following description, the expression "ITO layer" includes not only the ITO layer before patterning but also a pattern of ITO layer after the patterning, unless otherwise specified.

Japanese Laid-Open Patent Publication No. 3-246524 discloses a solution for the problem of partial loss. That is, conventionally, a double-layer structure of Al layer/ITO layer is adopted for display electrodes or interconnections, in place of the original single ITO layer, to reduce the electric resistance of the display electrodes or interconnections. With this double-layer structure, however, part of the ITO layer tends to be lost in a process of developing a resist layer formed on the Al layer with an alkaline solution. The publication discloses providing a protection layer made of molybdenum (Mo) or a Mo alloy (Mo—Ti, for example) between the ITO layer and the Al layer. By providing this protection layer, even if a pinhole exists in the Al layer, the above problem of partial loss of the ITO layer can be solved.

However, the inventors of the present invention have found that the method disclosed in Japanese Laid-Open Patent Publication No. 3-246524 described above has a problem as follows. Galvanic corrosion between ITO and Al is prevented by the formation of a Mo layer (including a Mo alloy layer) between the ITO layer and the Al layer. However, if a pinhole exists in the Al layer, the Al layer is corroded at a portion surrounding the pinhole when the Al layer is exposed to an alkaline developer, remover, or etchant, resulting in partial loss of the Al layer. Note that the method disclosed in the above publication is not directed to suppression/prevention of formation of a pinhole in the Al layer, but directed to prevention of galvanic corrosion between ITO and Al, and for this purpose, a Mo layer (or a Mo alloy layer) that can be etched together with the Al layer is formed as an intermediate layer blocking direct contact between the Al layer and the ITO layer.

If an Al layer is partially lost in a construction using the Al layer as part of a reflection electrode, the area of the resultant reflection electrode (reflection layer) decreases, resulting in deterioration of the function of reflecting ambient light. To state more specifically, in a method for fabricating a liquid crystal display device including an Al layer as a reflection layer, the Al layer is subjected to a process of developing a resist layer with an alkaline developer for formation of a resist pattern that is used as a mask in patterning of the Al layer, and a process of removing the resist pattern with an alkaline remover after the patterning of the Al layer. When the Al layer has a pinhole and is exposed to such an alkaline developer or remover in the above processes, a portion of the Al layer surrounding the pinhole (typically, a circle having a diameter of 2 to 5 μm) is lost. This partial loss of the Al layer (growth of the pinhole) is more eminent in the removing process than in the developing process. This is because a remover has higher ability of decomposing the resist layer than a developer, and also the surface area of the Al layer exposed to the remover is larger than that exposed to the developer.

In the patterning of the Al layer, the phenomenon of partial loss of the Al layer also causes the problem that peripheries of the patterned Al layer are jagged (like edges of a stamp). The patterning of the Al layer may be performed with a variety of materials (alkaline and acid solutions, and the like) by a variety of methods. When etching is adopted, occurrence of partial loss of the Al layer is more eminent in wet etching, which can advantageously etch the layered structure of Al layer/Mo layer with a same etchant, than in dry etching.

When an Al layer is temporarily deposited on an ITO layer as the top layer of a terminal electrode and then removed, part of the ITO layer may disadvantageously be lost due to galvanic corrosion between ITO and Al. For example, there is a case where an ITO layer is formed as the top layer of a terminal electrode such as a scanning line terminal electrode in a terminal area and the Al layer for formation of the reflection layer is temporarily deposited on the ITO layer. When the temporarily deposited Al layer is removed with an etchant, the ITO layer may be partially lost due to galvanic corrosion, and as a result the reliability of the terminal electrode may be impaired.

The problem of partial loss of an Al layer is disadvantageous, not only in the LCD device using the Al layer as the reflection layer, but also in LCD devices or other devices including interconnections, electrodes, or the like having the double-layer structure of Al layer/ITO layer, such as a display device using organic electroluminescence (EL) and a solar battery. For example, in an active matrix LCD device using TFTs that includes signal lines having the double-layer structure of Al layer/ITO layer, if the extent of partial loss of the Al layer is great, the Al layer may be narrowed excessively or may be broken. As a result, the Al layer may fail to sufficiently supplement the conductance of the ITO layer. If the conductance of a signal line decreases, normal display may not be obtained due to signal delay or the like. Note that in the following description the term "break" sometimes refers to the state where the conductance of an interconnection such as a signal line is reduced to such a degree that normal display is no more possible, in addition to the state where an interconnection is completely broken.

SUMMARY OF THE INVENTION

Objects of the present invention are providing a liquid crystal display device and a wiring substrate, which can suppress/prevent occurrence of partial loss of an Al layer formed on a Mo layer due to a pinhole in the Al layer, and methods for fabricating the liquid crystal display device and the wiring substrate.

The liquid crystal display device of the present invention includes a pair of substrates, a liquid crystal layer interposed between the pair of substrates, and a plurality of electrode pairs each facing each other via the liquid crystal layer, one of each pair of the plurality of electrode pairs being a reflection electrode for realizing display in a reflection mode, wherein the reflection electrode includes a first metal layer containing Mo (also called a Mo layer) and a second metal layer containing Al (also called an Al layer) formed on the first metal layer, and the first metal layer is a crystal layer having a maximum grain size of crystal grains at a surface of 60 nm or less or an amorphous layer.

The first metal layer is preferably composed of Mo.

Part of the reflection electrode may be formed on a transparent conductive layer made of ITO.

The method for fabricating a liquid crystal display device of the present invention is a method for fabricating a liquid crystal display device including a pair of substrates, a liquid crystal layer interposed between the pair of substrates, and a plurality of electrode pairs each facing each other via the liquid crystal layer, one of each pair of the plurality of electrode pairs being a reflection electrode for realizing display in a reflection mode. The reflection electrode is formed by a method including the steps of: forming a first metal layer containing Mo on one of the substrates, the first metal layer being a crystal layer having a maximum grain size of crystal grains at a surface of 60 nm or less or an amorphous layer; forming a second metal layer containing Al on the first metal layer; and patterning the first and second metal layers.

In the above method, the first metal layer is preferably composed of Mo.

The step of forming a first metal layer may include forming an amorphous first metal layer in an atmosphere containing nitrogen.

The method may further include the step of forming a transparent conductive layer made of ITO on the substrate before the step of forming a first metal layer, and at least part of the first metal layer may be formed on the transparent conductive layer.

The density of pinholes formed in the second metal layer is preferably 20 pcs./10000 $\mu m^2$ or less.

The step of patterning the first and second metal layers may include the steps of: forming a resist layer on the first and second metal layers; exposing the resist layer to light; forming a resist pattern having a predetermined pattern by developing the exposed resist layer with an alkaline developer; patterning the first and second metal layers using the resist pattern as a mask; and removing the resist pattern with an alkaline remover.

The step of patterning the first and second metal layers may include the step of etching at least one of the first and second metal layers.

The step of patterning the first and second metal layers preferably includes the step of wet-etching the first and second metal layers with a common etchant.

Alternatively, the method for fabricating a liquid crystal display device of the present invention is a method for fabricating a liquid crystal display device including a pair of substrates, a liquid crystal layer interposed between the pair of substrates, and a transparent conductive layer made of ITO formed on at least one of the pair of substrates. The method includes the steps of: forming the transparent conductive layer by a process of depositing an ITO layer on the at least one of the pair of substrates and patterning the ITO layer; forming a first metal layer containing Mo on the ITO layer or the transparent conductive layer, the first metal layer being a crystal layer having a maximum grain size of crystal grains at a surface of 60 nm or less or an amorphous layer; forming a second metal layer containing Al on the first metal layer; and patterning the first and second metal layers.

In the above alternative method, the transparent conductive layer may be formed as a top layer of a terminal electrode connected to an interconnection formed in a display area.

In the above alternative method, the liquid crystal display device may be a TFT active matrix liquid crystal display device, and at least one of a signal line, a source electrode, and a drain electrode may have a structure including the transparent conductive layer, the first metal layer, and the second layer layered sequentially.

In the above alternative method, the ITO layer may be patterned by forming a resist pattern on the ITO layer and wet-etching the ITO layer using the resist pattern as a mask, and the first and second metal layers may be patterned, separately from the patterning of the ITO layer, by forming a different resist pattern on the first and second metal layers and wet-etching the first and second metal layers using the different resist pattern as a mask.

The wiring substrate of the present invention includes interconnections or electrodes formed on a substrate, the interconnections or electrodes having a multilayer structure including a transparent conductive layer made of ITO. The interconnections or electrodes include a first metal layer containing Mo formed on the transparent conductive layer and a second metal layer containing Al formed on the first metal layer, and the first metal layer is a crystal layer having a maximum grain size of crystal grains at a surface of 60 nm or less or an amorphous layer.

The method for fabricating a wiring substrate of the present invention is a method for fabricating a wiring substrate including interconnections or electrodes formed on a substrate, the interconnections or electrodes having a multilayer structure including a transparent conductive layer made of ITO. The method includes the steps of: forming the transparent conductive layer by a process of depositing an ITO layer on the substrate and patterning the ITO layer; forming a first metal layer containing Mo on the ITO layer or the transparent conductive layer, the first metal layer being a crystal layer having a maximum grain size of crystal grains at a surface of 60 nm or less or an amorphous layer; forming a second metal layer containing Al on the first metal layer; and patterning the first and second metal layers.

In the above method for fabricating a wiring substrate, the ITO layer may be patterned by forming a resist pattern on the ITO layer and wet-etching the ITO layer using the resist pattern as a mask, and the first and second metal layers may be patterned, separately from the patterning of the ITO layer, by forming a different resist pattern on the first and second metal layers and wet-etching the first and second metal layers using the different resist pattern as a mask.

The present invention is based on the findings obtained as a result of an in-depth examination by the present inventors on the relationship between the surface structure (configuration) of a Mo layer and the number density of pinholes (also sometimes simply called the density of pinholes) generated in an Al layer deposited on the Mo layer.

When a Mo layer is deposited by sputtering, columnar crystal (typically, a polycrystal) of Mo is normally grown. When an Al layer is deposited on the Mo layer, pinholes are mostly generated in the grain boundary area at the surface of the Mo layer in the form of columnar crystal. If the size of crystal grains at the surface of the Mo layer is 60 nm or less, the density of pinholes generated in the Al layer is reduced to 20 pcs./10000 $\mu m^2$ or less. Further, if the size of crystal grains at the surface of the Mo layer is 30 nm or less, generation of pinholes is substantially prevented. The density of pinholes in the Al layer also depends on the thickness of the Al layer. In order to realize good reflection characteristics, the thickness of the Al layer is preferably 50 nm or more. The relationship between the size of crystal grains of the Mo layer and the density of pinholes in the Al layer described above is only established when the Al layer has a thickness of at least 50 nm.

The "crystal layer" as used herein collectively represents a layer including crystal grains, and includes not only a polycrystalline layer composed of a plurality of crystal grains but also a layer in which a plurality of crystal grains (islands) are scattered in an amorphous phase (sea) (sea-island structure). The "grain boundary" as used herein includes not only the boundary between crystal grains in a polycrystalline layer but also the boundary between an amorphous phase (sea) and crystal grains (island). The "size of crystal grains at the surface of the Mo layer" as used herein refers to the longitudinal length of crystal grains (typically, columnar crystal grains) in the two-dimensional plane obtained by observation of the surface configuration of the Mo layer, unless otherwise specified. The observation of the surface configuration is made with an optical microscope or an electron microscope, for example. The "size of crystal grains at the surface of the Mo layer" is sometimes simply called the "surface grain size" or the "grain size".

The grain size of the Mo layer may be controlled by adjusting the film formation conditions (typically, the sputtering conditions such as the gas pressure, the electric power supplied, and the film thickness) for the Mo layer. For example, the grain size of the Mo layer is reduced by increasing the electric power supplied during sputtering. If the electric power supplied is so high that the grain size of the deposited Mo layer is as small as less than about 4 nm, control of the film thickness may become difficult. In addition, splash may be generated in the Mo layer. If splash is generated, the Mo layer fails to sufficiently function as the protection layer. When the grain size of the Mo layer is in the range of 4 nm to 60 nm, the Mo layer can advantageously be deposited by sputtering to a thickness as designed without generation of splash.

In place of forming the crystal Mo layer having a small surface grain size, an amorphous Mo layer may be formed. No grain boundary exists at the surface of the amorphous Mo layer. Therefore, no pinhole is substantially generated in the Al layer deposited on the amorphous Mo layer. Such an amorphous Mo layer can be formed by depositing Mo in an atmosphere containing nitrogen gas, for example. To be strict, therefore, the amorphous Mo layer obtained by this method contains a trace amount of nitrogen.

As the nitrogen content of the amorphous Mo layer is higher, the electric resistance of the Mo layer is lower. Accordingly, the nitrogen content of the Mo layer may be appropriately adjusted in accordance with the structure and performance of the liquid crystal display device to be fabricated. If the nitrogen content is low, Mo columnar crystal will grow. In this case, however, the grain size of 60 nm or less can be obtained by adjusting the concentration of nitrogen gas in the atmosphere for film formation together with other film formation conditions.

The thickness of the Mo layer is preferably about 40 nm or more to sufficiently function as the protection layer. The Mo layer may be of a layered structure composed of a crystal layer including crystal grains having a size larger than 60 nm as the bottom layer and a crystal Mo layer having a grain size of 60 nm or less or an amorphous Mo layer as the top layer. As a matter of course, the layered structure may be composed of a crystal Mo layer having a grain size of 60 nm or less and an amorphous Mo layer.

In the method for fabricating a liquid crystal display device of the present invention, since the density of pinholes is low (or substantially no pinhole exists) in the Al layer formed on the Mo layer, it is possible to suppress/prevent occurrence of partial loss of the Al layer at portions surrounding pinholes in the process of patterning the Al layer by wet etching and in the process of removing a mask for etching used in the patterning of the Al layer with an alkaline remover. Further, in a construction where an ITO layer underlies the Mo layer, the Mo layer blocks galvanic corrosion between ITO and Al caused by an etchant or an alkaline developer or remover. This prevents occurrence of partial loss of the Al layer and the ITO layer.

DESCRIPTION OF THE PREFERRED EMBODIMENTS

Figure 1A:
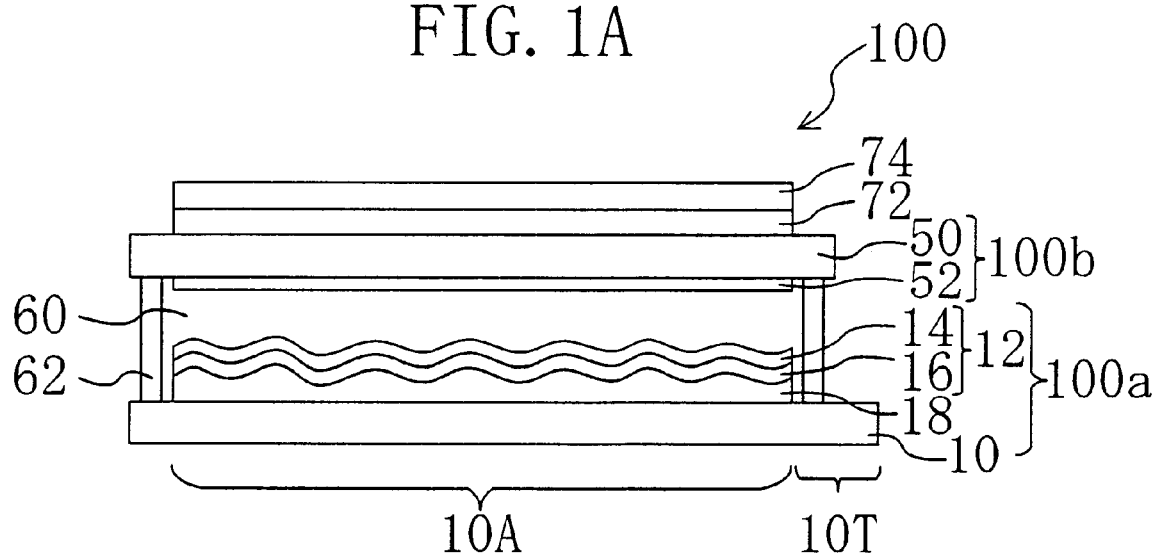
FIGS. 1A and 1B are a cross-sectional view and a plan view, respectively, schematically illustrating a liquid crystal display device 100 of EMBODIMENT 1 of the present invention.

Hereinafter, embodiments of the present invention will be described with reference to the accompanying drawings, taking reflection type liquid crystal display (LCD) devices and transmission type LCD devices as an example. Known constructions of LCD devices can be broadly adopted for components of the LCD devices of the present invention other than electrodes and interconnections that include a Mo layer and an Al layer formed on the Mo layer. Therefore, in the following description, details of these known components and fabrication methods thereof are omitted. Note, also, that throughout the drawings, components denoted by the same reference numeral are those constructed of substantially the same material.

EMBODIMENT 1

Figure 1B:
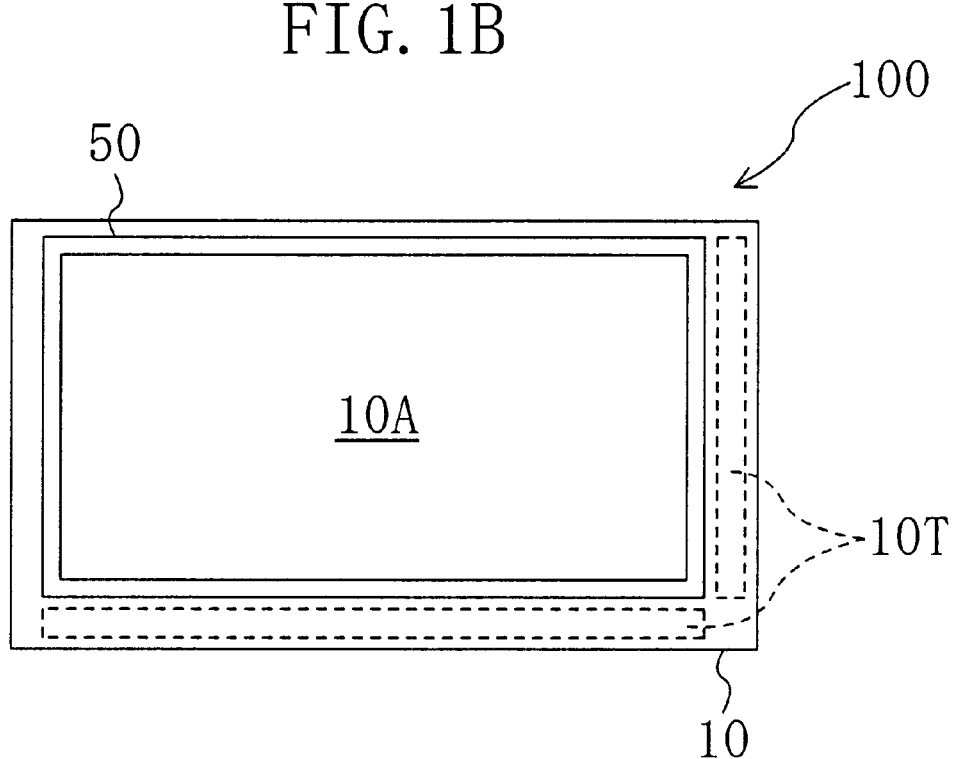

FIGS. 1A and 1B are a schematic cross-sectional view and a schematic plan view, respectively, illustrating an LCD device 100 of EMBODIMENT 1 of the present invention. The LCD device 100 is a reflection type active matrix LCD device using TFTs.

The LCD device 100 includes a reflection electrode substrate 100a, a counter substrate 100b, and a liquid crystal layer 60 interposed between the reflection electrode substrate 100a and the counter substrate 100b. The liquid crystal layer 60 is sealed between the substrates 100a and 100b with a sealant 62.

The reflection electrode substrate 100a includes a reflection electrode 12 on a base substrate 10 made of glass, for example. The reflection electrode 12 is essentially composed of an Al layer 14 (a metal layer containing Al) and an underlying Mo layer 16 (a metal layer containing Mo). Hereinafter, this structure of the reflection electrode 12 is also called the Al layer/Mo layer double-layer structure. Although schematically illustrated as one layer in FIG. 1A, the reflection electrode 12 is actually constructed of a plurality of pixel electrodes arranged in a matrix each connected to a TFT (not shown). The reflection electrode 12 has a wavelike (concave and convex profile) surface to enable ambient light to be diffuse-reflected (or "scattered") at an appropriate angle distribution. In the illustrated example, a resin layer 18 having a wavelike surface is first formed, and the Mo layer 16 and the Al layer 14 are sequentially formed on the resin layer 18 to obtain the reflection electrode 12 having a wavelike surface. The maximum grain size of Mo at the surface of the Mo layer 16 of the reflection electrode 12 is 60 nm or less. The Al layer 14 formed on the Mo layer 16 has an area and a thickness as designed, and thus has reflection characteristics as designed. The construction and the formation method of the reflection electrode 12 will be described later in detail.

The counter substrate 100b includes a transparent counter electrode 52 made of indium tin oxide (ITO) or the like formed on the surface of a transparent base substrate 50 facing the liquid crystal layer 60. The counter electrode 52 is a single common electrode facing the reflection electrode 12 as a plurality of electrodes (pixel electrodes). Alignment films (not shown) are formed on the surfaces of the counter electrode 52 and the reflection electrode 12. Liquid crystal molecules (not shown) in the liquid crystal layer 60 are twisted by 90°. For twisted nematic (TN) mode display, a quarter wave ($\lambda/4$) plate 72 and a polarizing plate 74 are disposed on the side of the counter substrate 100b facing the viewer (opposite to the side of the liquid crystal layer 60). A color filter layer (not shown) may be formed as required.

In the LCD device 100, the orientation state of the liquid crystal molecules in the liquid crystal layer 60 changes depending on the voltage applied between the counter electrode 52 and each of the reflection electrodes 12. In accordance with the change in orientation state, the intensity of reflected light is modulated, and thus display is realized. The region where each of the reflection electrodes 12 faces the counter electrode 52 defines one pixel region (a region corresponding to one pixel as a minimum display unit). When a black matrix is formed, each opening of the black matrix defines one pixel region.

In the LCD device 100, an area including a plurality of pixel regions where display is realized is called a display area 10A, and areas located on peripheries of the display area 10A are called terminal areas 10T where terminal electrodes for scanning lines and signal lines (both not shown) for applying a voltage to TFTs are formed. As will be described later, the Al layer/Mo layer double-layer structure of the reflection electrode 12 and the formation method thereof according to the present invention are also advantageous for formation of the terminal electrodes. That is, an ITO layer is formed as the top layer of the terminal electrode to prevent increase in contact resistance due to oxidation. In the fabrication process of the LCD device 100, there may arise the case where an Al layer must be temporarily deposited on the ITO layer and then patterned. In such a case, part of the ITO layer may possibly be lost due to galvanic corrosion between ITO and Al. This problem of partial loss of the ITO layer of the terminal electrode can be prevented by adopting the reflection electrodes 12 having the Al layer/Mo layer double-layer structure according to the present invention, as will be described later in detail.

Figure 2A:
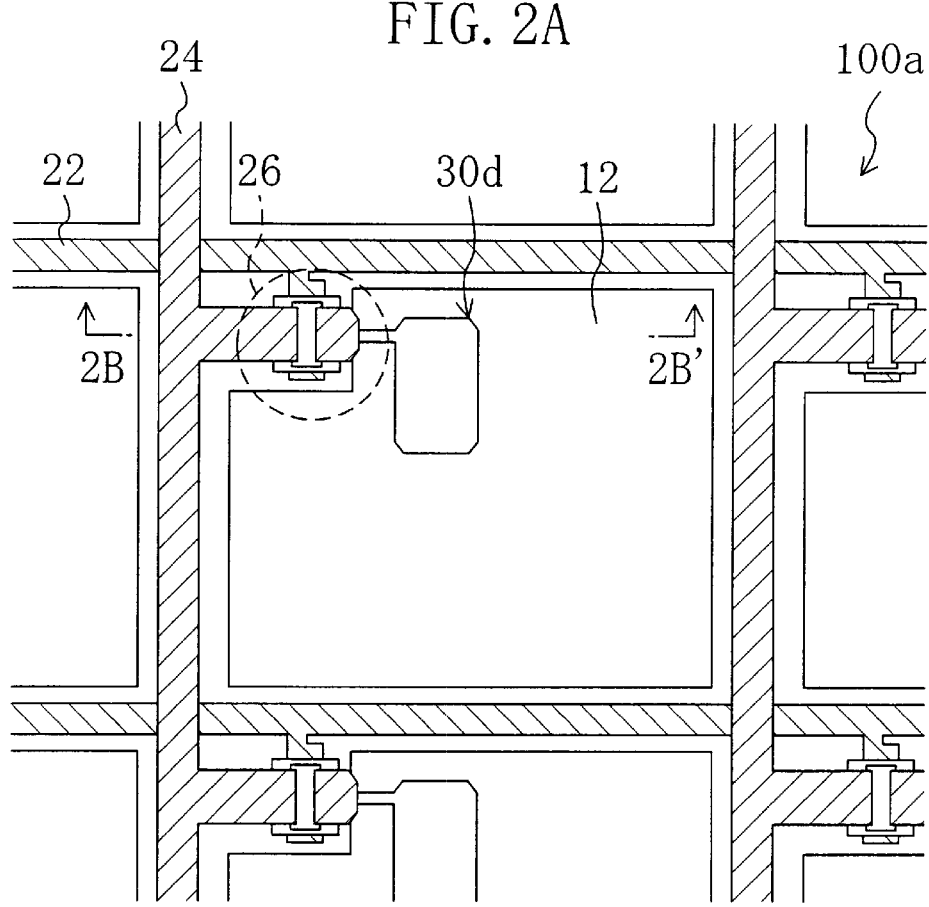
FIGS. 2A and 2B are a plan view and a cross-sectional view, respectively, schematically illustrating a reflection electrode substrate 100a of the liquid crystal display device 100 of EMBODIMENT 1.
Figure 2B:
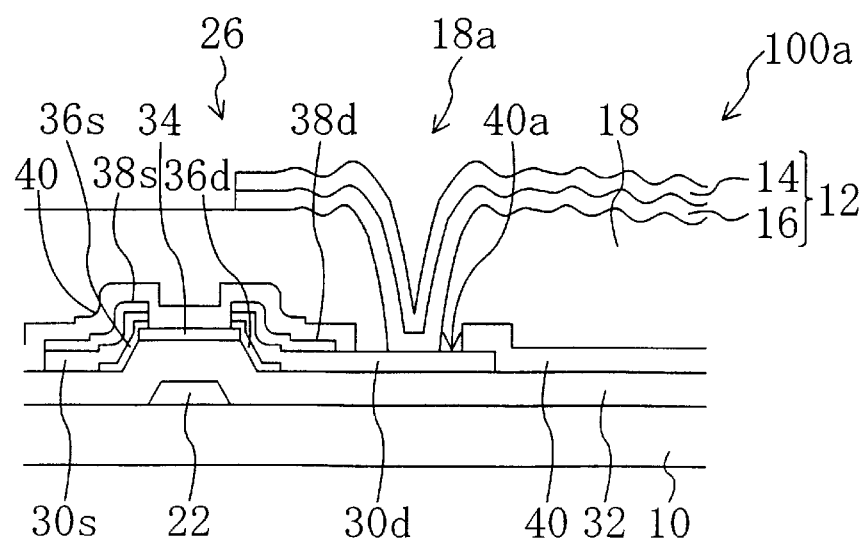

Hereinafter, the structure and the formation method of the reflection electrode 12 will be described in detail with reference to FIGS. 2A and 2B. FIG. 2A is a plan view of the reflection electrode substrate 100a of the LCD device 100 focusing on one pixel region. FIG. 2B is a cross-sectional view taken long line 2B-2B' in FIG. 2A.

The reflection electrode substrate 100a includes a plurality of scanning lines (gate bus lines) 22 running in parallel with one another, a plurality signal lines (source bus lines) 24 running in parallel with one another to cross the scanning lines 22, and a plurality of TFTs 26 formed at respective crossings of the scanning lines 22 and the signal lines 24, which are all formed on the base substrate 10. The reflection electrodes 12 are connected to the respective TFTs 26.

Referring to FIG. 2B, the scanning lines and gate electrodes 22 (these are generally formed integrally and thus denoted by the same reference numeral) are formed on the base substrate 10. A gate insulating layer 32 is formed to cover the scanning lines and gate electrodes 22. On the gate insulating layer 32, formed are a semiconductor layer 34, a source contact layer 36s and a drain contact layer 36d, and a source electrode 38s and a drain electrode 38d, thereby constituting each TFT 26. A passivation layer 40 is formed on roughly the entire surface covering each TFT 26. The resin layer 18 having a wavelike surface is formed covering the passivation layer 40. The reflection electrode 12 is formed on the resin layer 18.

Electrodes 30s and 30d made of ITO are formed between the source contact layer 36s and the source electrode 38s and between the drain contact layer 36d and the drain electrode 38d, respectively, for each TFT. The electrode 30d on the drain side (this electrode is also called a connection electrode) is electrically connected with the reflection electrode 12 via a contact hole 18a formed through the resin layer 18 and a contact hole 40a formed through the passivation layer 40.

The components other than the reflection electrode 12 can be formed of known materials by known methods. For example, Tantalum (Ta) is used for formation of the scanning line and gate electrode 22, the signal line 24, the source electrode 38s, and the drain electrode 38d in the illustrated example. Alternatively, other materials (metals, doped semiconductors, and layered structure thereof) may be used as long as a desired wiring resistance is secured. If the material allows good ohmic contact with the Mo layer 16, the drain electrode 38d may be exposed to the contact hole 40a. The gate insulating layer 32 may be formed of silicon oxide, the semiconductor layer 34 may be formed of amorphous silicon (a-Si), the source contact layer 36s and the drain contact layer 36d may be formed of n$^+$-Si, and the passivation layer 40 may be formed of silicon nitride ($SiN_x$), for example. These films may be formed by repeating the processes of film formation, photolithography, etching, and resist removal. Alternatively, continuous film formation, batch etching, and the like may be employed.

The fabrication process after the formation of the passivation layer 40 will be described with reference to FIGS. 3A through 3C.

Figure 3A:
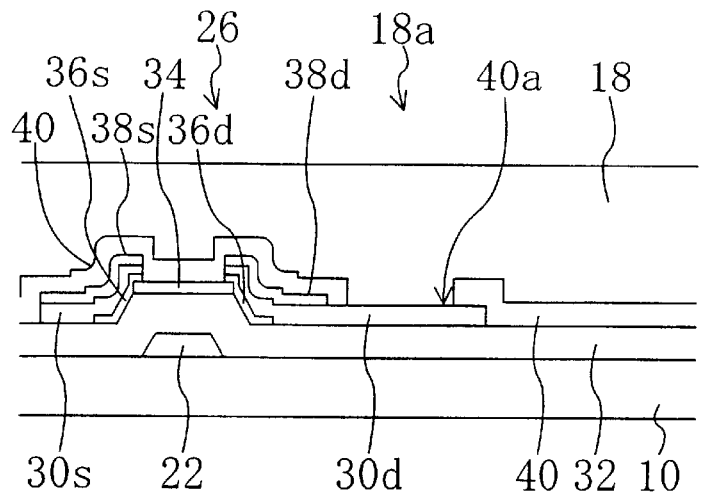
FIGS. 3A through 3C are cross-sectional views schematically illustrating a fabrication process of the reflection electrode substrate 100a of the liquid crystal display device 100 of EMBODIMENT 1.

Referring to FIG. 3A, the resin layer 18 is formed covering the surface of the resultant base substrate 10 with the TFTs and the like formed thereon. Specifically, a positive photosensitive resin (e.g., OFPR-800 manufactured by Tokyo Ohka Kogyo Co., Ltd,), for example, is applied to the base substrate 10 with the TFTs 26 and the passivation layer 40 formed thereon to a desired thickness (e.g., 1.5 μm).

Figure 4A:
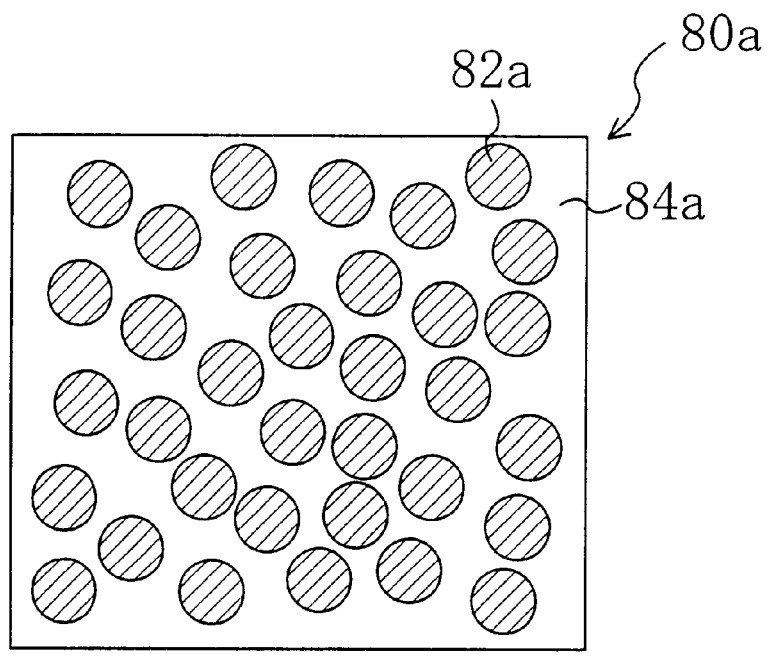
FIGS. 4A and 4B schematically illustrate examples of photomasks used in the fabrication of the liquid crystal display device 100 of EMBODIMENT 1.
Figure 4B:
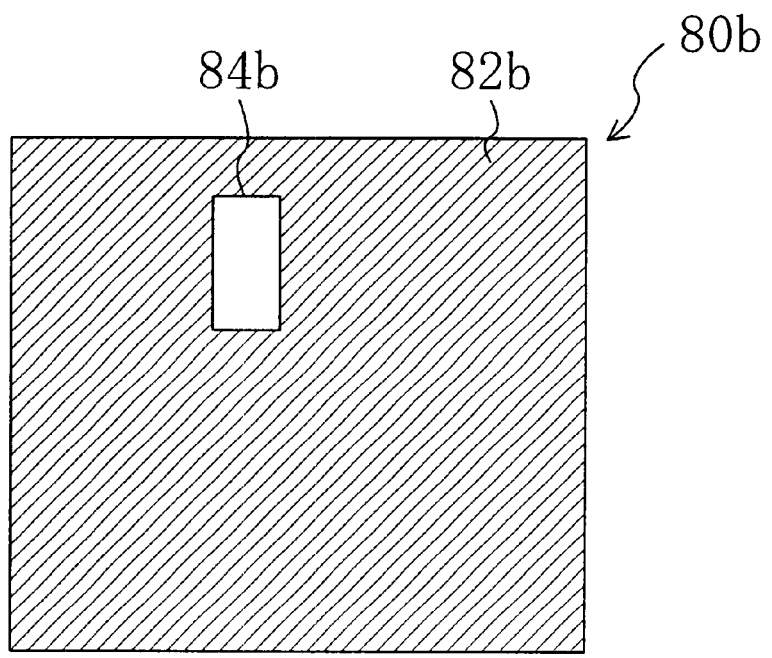

The resultant base substrate 10 is prebaked at about 100° C. for about 30 seconds, and then subjected to a total of two light exposure processes, that is, exposure at 400 mJ (high illumination exposure) via a photomask 80b shown in FIG. 4B and exposure at 180 mJ (low illumination exposure) via a photomask 80a shown in FIG. 4A. The order of the two exposure processes may be reversed.

The photomasks 80a and 80b shown in FIGS. 4A and 4B respectively include light-shading portions 82a and 82b and light-transmitting portions 84a and 84b. FIGS. 4A and 4B are schematic illustrations of portions of the photomasks 80a and 80b corresponding to one pixel. In the photomask 80a of FIG. 4A, the light-shading portions 82a preferably occupy about 20% to about 40% of the entire area of the reflection electrode, and every adjacent light-shading portions 82a are preferably apart from each other by about 5 μm to about 50 μm, more preferably by about 10 μm to about 20 μm, as measured between the centers thereof. The centers of the respective light-shading portions 82a are arranged randomly in the plane. The shape of the light-shading portions 82a is not limited to a circle as illustrated, but may be a polygon. In the photomask 80b of FIG. 4B, the light-transmitting portion 84b is for formation of the contact holes 18a and 40a. Although not shown, the photomask 80b also has light-transmitting portions at positions corresponding to terminal electrode portions (scanning line terminal electrode portions and signal line terminal electrode portions) formed on the reflection electrode substrate 100a.

The exposed positive photosensitive resin is then developed with a developer (e.g., TMA (tetramethyl ammonium hydroxide) manufactured by Tokyo Ohka Kogyo Co., Ltd,), to remove high illumination exposure portions of the photosensitive resin corresponding to the light-transmitting portions of the photomask 80b that correspond to the contact hole formation portions and the terminal electrode portions. At this development, about 40% of the initial film thickness remains in the low illumination exposure portions of the photosensitive resin corresponding to the light-transmitting portions 84a of the photomask 80a, while about 80% of the initial film thickness remains in the non-exposure portions of the photosensitive resin corresponding to the light-shading portions 82a of the photomask 80a.

The resultant photosensitive resin is preheated at 90° C. for one minute, and then heat-treated at about 200° C. for about 60 minutes. By this heat treatment, the photosensitive resin is deformed in sectional shape due to a heat sagging phenomenon, forming a surface of a smooth concave and convex profile.

Figure 3B:
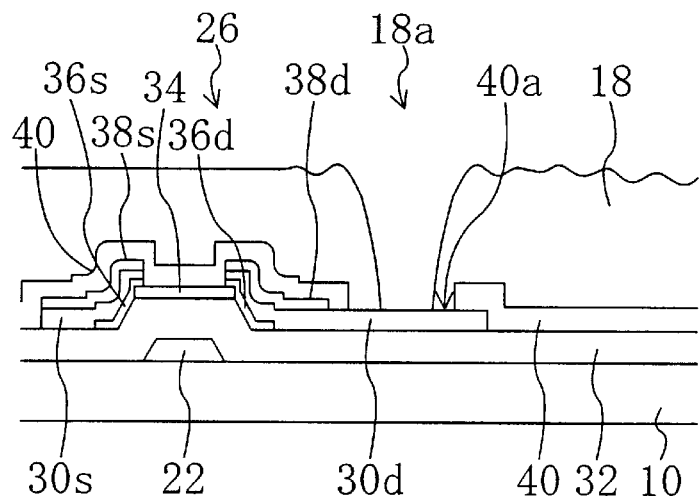

As a result, as shown in FIG. 3B, formed are the resin layer 18 having a wavelike surface and the contact hole 18a for electrically connecting the reflection electrode 12 to the connection electrode 30d. Thereafter, descumming (scum removing process) with $O_2$ plasma may be performed before formation of the reflection electrode 12. The exposure amount of 180 mJ was used in the exposure process via the photomask 80a for formation of the wavelike surface of the resin layer 18. This amount however may be changed appropriately since the diffusion characteristic (angle distribution of diffusion-reflected light) required varies depending on the panel size of the LCD device. The reflection electrode substrate 100a may also be fabricated by a method other than that described above, such as the method disclosed in Japanese Laid-Open Patent Publication No. 6-75238.

Figure 3C:
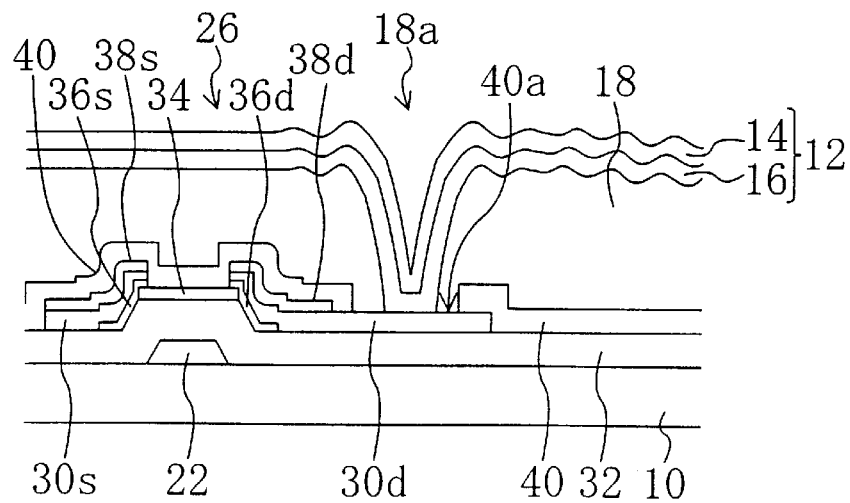
Figure 5:
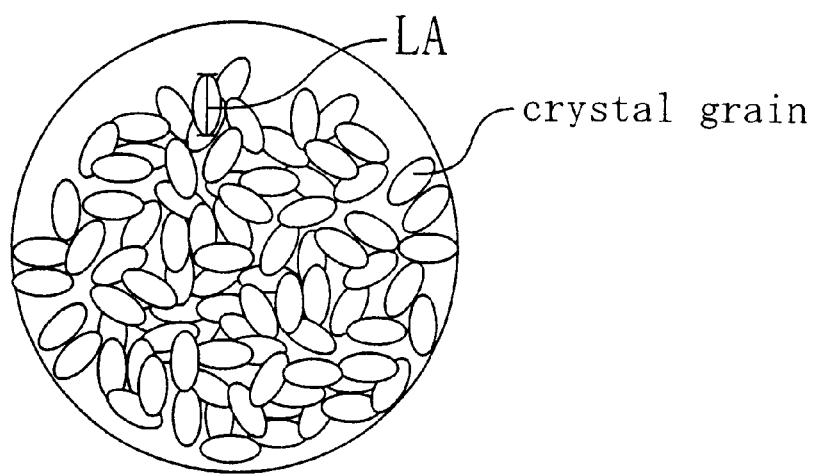
FIG. 5 schematically illustrates a microscope observation result of a Mo layer 16 formed in EMBODIMENT 1.

Referring to FIG. 3C, the reflection electrode 12 having the double-layer structure of the Mo layer 16 and the Al layer 14 is formed on the resultant substrate. Herein, as concrete examples of EMBODIMENT 1, two types of crystal layers were formed as the Mo layer 16: a Mo layer having a surface grain size of 30 nm or less (Example 1) and a Mo layer having a surface grain size of 60 nm or less (Example 2). For comparison, a Mo layer having a surface grain size of 90 nm or less (Comparative Example 1) was also formed. The Mo layers of these examples were formed with the same sputtering apparatus. Table 1 below shows the deposition conditions of the Mo layer 16 and the maximum grain size at the surface of the resultant Mo layer 16 as observed with an optical microscope or an electron microscope for each example. FIG. 5 schematically illustrates a surface configuration of the Mo layer 16 obtained by the surface observation. As is apparent from FIG. 5, the columnar crystal grains of Mo are observed as ellipses. Defining the length of the major axis LA of each ellipse as the grain size, the maximum grain size at the surface of the Mo layer 16 was determined. More specifically, the maximum grain size was determined by observing the surface of the Mo layer 16 at portions each having the area of 2.3 μm×1.7 μm in the center and peripheral regions of the substrate.

TABLE 1

| | Ambient pressure | Power supplied | Film thickness | Surface Grain size |
|---|---|---|---|---|
| Example 1 | 0.5 Pa | 15 KW | 50 nm | 30 nm or less |
| Example 2 | 0.5 Pa | 10 KW | 50 nm | 60 nm or less |
| Comparative Example 1 | 0.5 Pa | 15 KW | 150 nm | 90 nm or less |

The Al layer 14 was then deposited on each of the resultant Mo layers 16 by sputtering. For all the examples, the deposition of the Al layer 14 was performed under the conditions of an ambient pressure of 0.2 Pa, an electric power supplied of 10 KW, and a film thickness of 100 nm. In the case where the Mo layer 16 is deposited under the conditions for obtaining the surface grain size of 60 nm, the Al layer 14 can be deposited continuously from the deposition of the Mo layer 16 without breaking the vacuum of the sputtering apparatus. The number density of pinholes generated in the resultant Al layer 14 was determined from microscope observation. More specifically, the number density of pinholes generated in the Al layer 14 was determined by counting the number of pinholes in the area of 100 $\mu$m×100 $\mu$m corresponding to the typical pixel size.

No pinhole was observed in the Al layer 14 formed on the Mo layer 16 of Example 1, while pinholes of 5 to 10 pcs./10000 $\mu$m$^2$ were observed in the Al layer 14 formed on the Mo layer 16 of Example 2. Pinholes as many as 200 to 300 pcs./10000 $\mu$m$^2$ were observed in the Al layer formed on the Mo layer of Comparative Example 1.

The thus-formed Mo layer 16 and Al layer 14 were patterned to obtain the reflection electrode 12 having the shape shown in FIG. 2B. The patterning of the Mo layer 16 and the Al layer 14 was performed in the following manner.

First, a resist layer having a predetermined pattern was formed by a normal photolithographic process. Using the resist film as a mask, portions of the Mo layer 16 and Al layer 14 exposed through openings of the resist layer were removed at one time with an etchant of a mixed acid prepared by mixing acetic acid, phosphoric acid, and nitric acid in water.

Thereafter, the resist layer as a mask was removed with an alkaline remover (e.g., Remover 106 manufactured by Tokyo Ohka Kogyo Co., Ltd.).

Table 2 below shows the results of observation of the resultant reflection electrode 12 with an optical microscope or an electron microscope, as well as the reflectance measured, for each of Examples 1 and 2 and Comparative Example 1. The reflectance was evaluated as reduction from the reflectance of the Al layer 14 just deposited (before patterning).

TABLE 2

| | Surface grain size | Loss in reflection electrode | Reduction in reflectance |
|---|---|---|---|
| Example 1 | 30 nm or less | None | None |
| Example 2 | 60 nm or less | Circle void/edge void | None |
| Comparative Example 1 | 90 nm or less | Circle void/edge void | about 10% |

In Example 1 where no pinhole was observed in the Mo layer 16, no void was generated in the reflection electrode 12 (Al layer 14) and thus no reduction in reflectance was recognized. In Example 2, there were generated edge voids where the edges of the reflection electrode 12 were sagged, as well as circle voids to be described later, but no reduction in reflectance was recognized. On the contrary, in Comparative Example 1, circle voids having a diameter of 2 $\mu$m to 5 $\mu$m were observed at positions surrounding pinholes, and the reflectance decreased by 8% to 13%. Reflection type LCD devices as shown in FIGS. 1A and 1B were fabricated using the resultant reflection electrode substrates, and the display characteristics were evaluated. As a result, the LCD device in Comparative Example 1 was inferior in reflectance by about 10% to the LCD devices in Examples 1 and 2.

From the results described above, it was confirmed that the Mo grain size at the surface of the Mo layer 16 had correlation with the number of pinholes generated in the Al layer 14. Furthermore, the following was found. When the surface grain size of the Mo layer is 60 nm or less, no practical problem will arise. When the surface grain size is 30 nm or less, no pinhole is generated and thus a reflection electrode with good reflection characteristics can be formed.

As shown in FIG. 2B, part of the reflection electrode 12 is in direct contact with the connection electrode 30d composed of an ITO layer. According to the present invention, since the Al layer 14/Mo layer 16 double-layer structure is adopted for the reflection electrode 12, the ITO layer of the connection electrode 30d is prevented from being partially lost due to galvanic corrosion in the processes of patterning of the reflection electrodes 12 and resist removal described above.

By adopting the Al layer/Mo layer double-layer structure according to the present invention, it is also possible to prevent an ITO layer formed as the top layer of each terminal electrode of the reflection electrode substrate 100a from being partially lost due to galvanic corrosion between ITO and Al, as will be described below.

Figure 6:
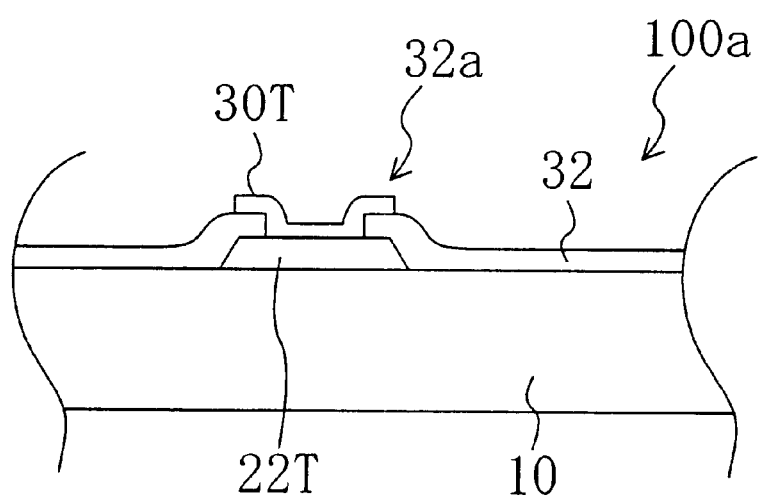
FIG. 6 is a schematic cross-sectional view of a scanning line terminal electrode 22T of the liquid crystal display device 100 of EMBODIMENT 1.

FIG. 6 schematically shows a cross-sectional structure of a scanning line terminal electrode 22T formed in the terminal area (10T in FIGS. 1A and 1B), which is connected to an interconnection (scanning line) in the display area (10A in FIGS. 1A and 1B). Although not shown, a signal line terminal electrode connected to a signal line in the display area has substantially the same structure. The scanning line terminal electrode 22T shown in FIG. 6 is formed integrally with the scanning lines and gate electrodes 22 on the base substrate 10. The gate insulating layer 32 formed covering the scanning line terminal electrode 22T has an opening 32a. An ITO layer 30T is formed in the opening 32a to be electrically connected with the scanning line terminal electrode 22T. The ITO layer 30T serves to block the surface of the scanning line terminal electrode 22T from being oxidized with the air and thus maintain low connection resistance. The ITO layer 30T is formed together with the connection electrode 30d described above in the same process, for example.

In the fabrication process of the reflection electrode substrate 100a, the layers (the Mo layer 16 and the Al layer 14) for formation of the reflection electrodes 12 are also deposited on the ITO layer 30T temporarily. If the Al layer 14 is directly formed on the ITO layer 30T as in the conventional case, part of the ITO layer 30T will be lost due to galvanic corrosion between Al and ITO in the process of removing the Al layer 14. By adopting the Al layer/Mo layer double-layer structure according to the present invention, however, this trouble of losing part of the ITO layer 30T due to galvanic corrosion is prevented.

Figure 7A:
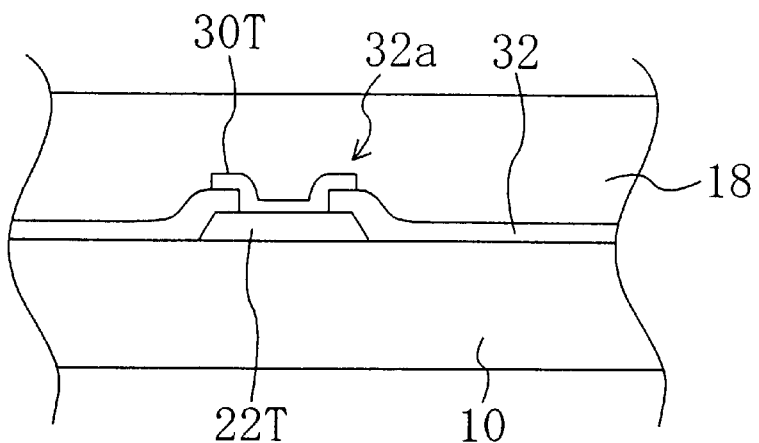
FIGS. 7A through 7C are cross-sectional views schematically illustrating a fabrication process of the scanning line terminal electrode 22T of the liquid crystal display device 100 of EMBODIMENT 1.
Figure 7B:
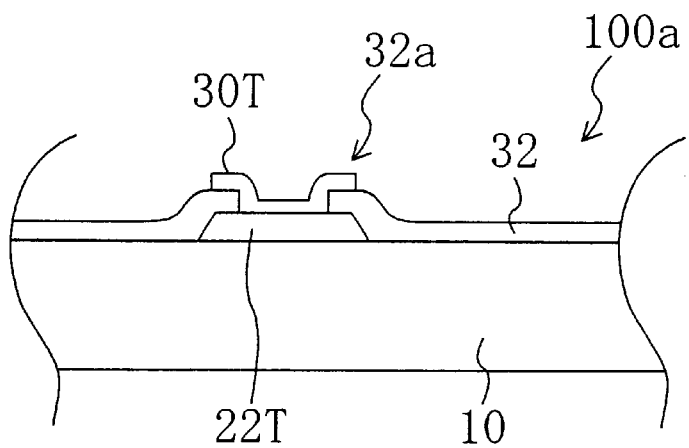
Figure 7C:
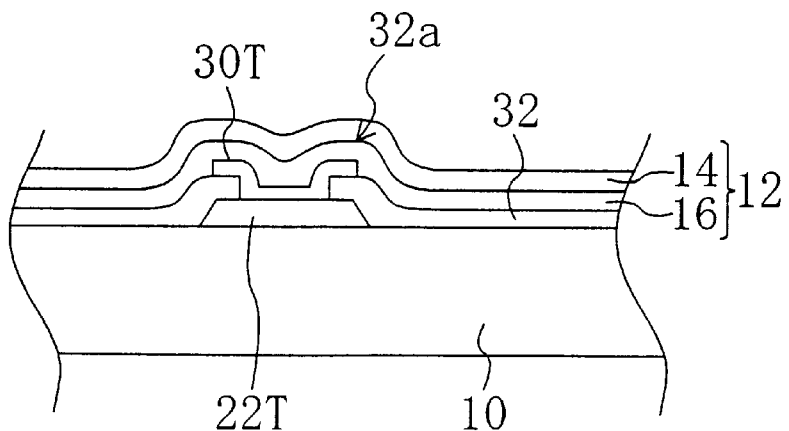

A method for forming the scanning line terminal electrode 22T will be described with reference to FIGS. 7A through 7C. FIGS. 7A, 7B, and 7C show the cross-sectional structure of a scanning line terminal electrode portion in the respective steps shown in FIGS. 3A, 3B, and 3C.

Referring to FIG. 7A, the positive photosensitive resin for formation of the resin layer 18 is applied covering the scanning line terminal electrode portion that includes the ITO layer 30T as the top layer (see FIG. 3A).

Referring to FIG. 7B, in the process of exposure and development of the positive photosensitive resin, the scanning line terminal electrode portion that includes the ITO layer 30T as the top layer is uncovered (see FIG. 3B). That is, the photomask 80b used in the process of exposure of the positive photosensitive resin has a light-transmitting portion at the position corresponding to the scanning line terminal electrode portion.

Referring to FIG. 7C, the Mo layer 16 and the Al layer 14 for formation of the reflection electrodes 12 are temporarily deposited on the entire surface of the resultant base substrate 10 including the exposed ITO layer 30T. Thereafter, as described above with reference to FIG. 3C, the Mo layer 16 and the Al layer 14 are patterned into a predetermined shape in the photolithographic process using a resist to form the reflection electrodes 12 having the Al layer/Mo layer double-layer structure. During this process, the Mo layer 16 and the Al layer 14 covering the scanning line terminal electrode portion are removed at one time.

According to the present invention, the Al layer 14 is deposited on the ITO layer 30T via the Mo layer 16. This prevents the Al layer 14 from being in direct contact with the ITO layer 30T in the patterning process for formation of the reflection electrodes 12 (process of etching the Mo layer 16 and the Al layer 14), and thus prevents the ITO layer 30T from being partially lost due to galvanic corrosion between ITO and Al.

Thus, in this embodiment of the present invention, partial loss of the Al layer due to existence of a pinhole is prevented in the process for formation of the reflection electrodes 12. In addition, in the occasion where the reflection electrode 12 must be formed on an ITO layer, the ITO layer and the Al layer can be prevented from being partially lost due to galvanic corrosion between ITO and Al. Moreover, in the construction where an ITO layer is formed as the top layer of the terminal electrode, the ITO layer can be prevented from being partially lost due to galvanic corrosion between ITO and Al in the process of removing the Al layer that has been temporarily formed on the ITO layer. As a result, this embodiment makes it possible to form reflection electrodes having the reflection characteristics as designed and also form terminal electrodes with high reliability.

In this embodiment, described was the case where an ITO layer is formed as the top layer of the terminal electrodes. The present invention is not limited to this case, but the function and effect described above can also be provided for other cases such as having an ITO layer as the top layer of interconnections and electrodes formed in the display area.

In this embodiment, pure Mo and pure Al were used for the Mo layer 16 and the Al layer 14, respectively. Alternatively, a small amount of other metal may be added to the material of each layer without impairing the effect of the present invention. The kind and amount of the added metal may be appropriately determined in consideration of the electric characteristics (resistivity and the like), easiness of patterning, and the like. In this embodiment, a positive resist was used to form the resin layer 18. Alternatively, a negative resist may be used. Otherwise, the resin layer may be formed of a non-photosensitive insulating material. In this case, however, a resist is separately required to form the contact holes and to provide wavelike profile on the surface. The above alternatives are also applicable to EMBODIMENT 2 to be described below.

How crystal grains of the Mo layer 16 grow depends on the material of the underlying layer. That is, the Mo crystal grains may fail to establish a definite columnar crystal shape depending on the material of the underlying layer. Even in such a case, the effect of the present invention can be obtained as long as the maximum grain size of crystal grains at the surface of the Mo layer 16 is 60 nm or less.

EMBODIMENT 2

In EMBODIMENT 2, the Mo layer 16 is formed of amorphous Mo by performing the sputtering film formation process in an atmosphere containing nitrogen gas. This embodiment is the same as EMBODIMENT 1 except that the Mo layer 16 is made of amorphous Mo, and thus detailed description of this embodiment except for the Mo layer 16 is omitted here.

The Mo layer 16 made of amorphous Mo can be formed by performing the process of depositing Mo to a thickness of 50 nm under the conditions of an electric power supplied of 10 KW and an ambient pressure of 0.5 Pa, for example, while flowing nitrogen ($N_2$) gas at a flow of 20 sccm. The surface of the resultant Mo layer 16 made of amorphous Mo was observed with an optical microscope or an electron microscope. As a result, found were only structures finer than those found at the surface of the Mo layer 16 in Example 1 of EMBODIMENT 1 (grain size of 30 nm or less). This is because an amorphous phase has a structure where bonds of every several atoms are coupled together, thereby including substantially no crystal grains.

The Al layer 14 was formed on the resultant Mo layer 16 as in EMBODIMENT 1. The structure of Al layer 14/Mo layer 16 was then patterned, and a resist used in the patterning was removed. No pinhole was observed in the resultant Al layer 14, and no reduction in reflectance was recognized. The resultant LCD device 100 including the reflection electrodes 12 formed in the above manner exhibited excellent display characteristics as in Example 1 of EMBODIMENT 1. The Mo layer 16 formed in the nitrogen atmosphere contains a trace amount of nitrogen. However, no deterioration in display characteristics due to reduction in electric resistance was observed. In this embodiment, the Mo layer 16 was formed under the flow of nitrogen gas of 20 sccm. The flow of the nitrogen gas is not limited to this value, but may be appropriately adjusted within the range where the resultant Mo layer 16 has a resistance of a desired value or less.

The film formation conditions used in EMBODIMENTS 1 and 2 described above are those specific to the sputtering apparatus used by the present inventors. Therefore, the film formation conditions are not restricted to the above values, but may vary depending on the specifications and the like (for example, the chamber volume and the like) of a sputtering apparatus used.

EMBODIMENT 3

Figure 8:
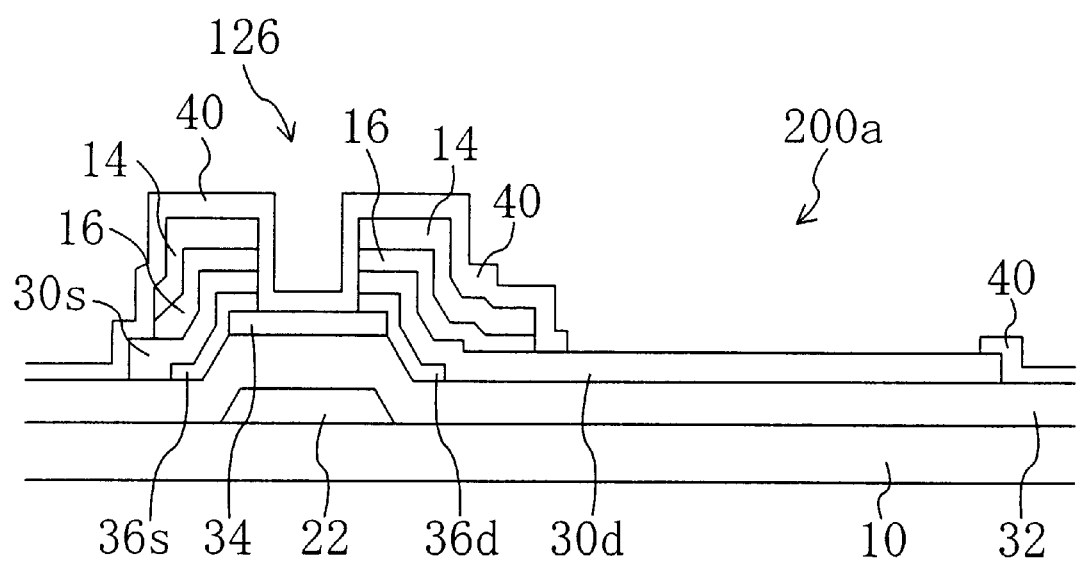
FIG. 8 is a schematic cross-sectional view of a TFT substrate 200a in EMBODIMENT 3.

As the LCD device of EMBODIMENT 3 of the present invention, a transmission type active matrix LCD device using TFTs will be described. FIG. 8 is a schematic cross-sectional view of a TFT substrate 200a in this embodiment. In the TFT substrate 200a, signal lines and source and drain electrodes have a structure composed of a transparent conductive layer made of ITO, a Mo layer 16, and an Al layer 14 layered sequentially.

Note that in this embodiment and in EMBODIMENT 4 to be described later, the ITO layer after patterning is specifically called a transparent conductive layer indicative of one component of the device. The ITO layer is patterned to form transparent conductive layers as part of the source electrodes and drain electrodes, and the transparent conductive layer on the side of each source electrode (source-side transparent conductive layer) is denoted by 30s, while the transparent conductive layer on the side of each drain electrode (drain-side transparent conductive layer) is denoted by 30d. The portion of the transparent conductive layer 30d that is not covered with the Mo layer 16 and the Al layer 14 serves as a pixel electrode. The source-side transparent conductive layer 30s, the Mo layer 16, and the Al layer 14 form a signal line (source bus line) extending vertical to the plane of FIG. 8.

The process of forming a TFT 126 shown in FIG. 8 in this embodiment is the same as that in EMBODIMENT 1 until the formation of the semiconductor layer 34. That is, the scanning line and gate electrode 22, the gate insulating layer 32, the semiconductor layer 34, the source contact layer 36s, and the drain contact layer 36d for each TFT are formed by performing the processes of film formation, photolithography, etching, and resist removal in the manner described in EMBODIMENT 1.

On the resultant base substrate 10 including the semiconductor layer 34, an ITO layer is deposited to a thickness of about 100 nm with a sputtering apparatus or the like. The Mo layer 16 is then formed on the ITO layer by sputtering. As Examples 3 and 4 of EMBODIMENT 2 and Comparative Example 2, the Mo layer 16 was formed to have surface grain sizes of 30 nm or less (Example 3), 60 nm or less (Example 4), and 90 nm or less (Comparative Example 2) under the same film formation conditions as those adopted in EMBODIMENT 1. Thereafter, the Al layer 14 is formed on the Mo layer 16 by sputtering or the like. In Examples 3 and 4 and Comparative Example 1, the Al layer 14 having a thickness of about 100 nm was formed by sputtering under the same conditions as those adopted in EMBODIMENT 1.

Hereinafter, patterning of the ITO layer 130, the Mo layer 16, and the Al layer 14 on the source electrode side of each TFT 126 will be described with reference to FIGS. 9A through 9G. FIGS. 9A through 9G are schematic cross-sectional views for description of patterning of these layers. Note that the ITO layer is denoted by 130 before it is patterned to form the source-side transparent conductive layer 30s. In FIGS. 9A through 9G, the base substrate 10, the gate electrode 22, and the semiconductor layer 34 shown in FIG. 8 are omitted for simplification. These components are also omitted in FIGS. 10A through 10F and 11 to be referred to later.

Figure 9A:
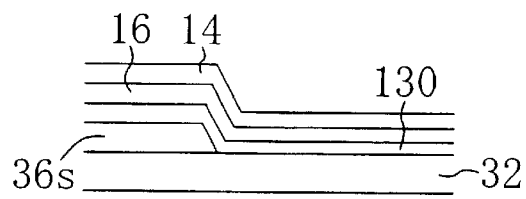
FIGS. 9A through 9G are schematic cross-sectional views for description of a patterning process for obtaining a source-side transparent conductive layer 30s, a Mo layer 16, and an Al layer 14 of a TFT 126 in EMBODIMENT 3.
Figure 9B:
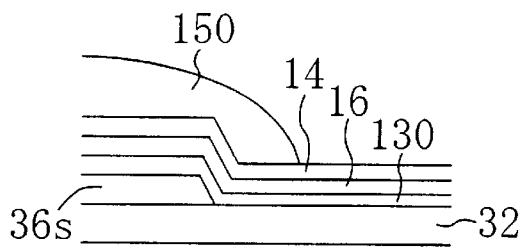
Figure 9C:
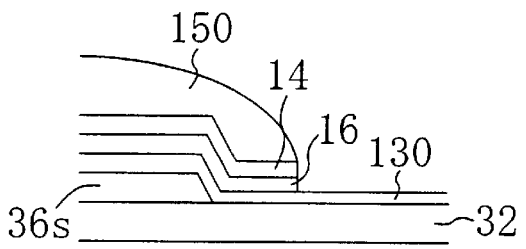
Figure 9D:
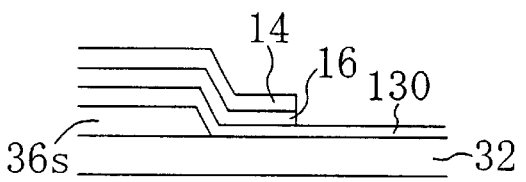
Figure 9E:
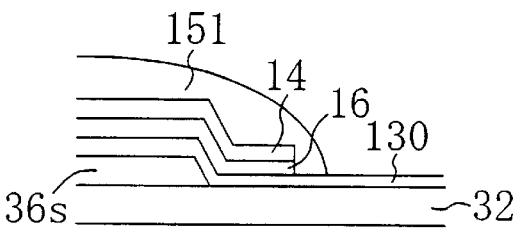

After the sequential formation of the ITO layer 130, the Mo layer 16, and the Al layer 14 (see FIG. 9A), a resist is applied to the resultant base substrate and patterned by photolithography to form a resist pattern 150 for patterning the Mo layer 16 and the Al layer 14 (hereinafter, this resist pattern is also called a resist pattern for Al/Mo patterning) (see FIG. 9B). Using the resist pattern 150 for Al/Mo patterning as a mask, portions of the Mo layer and the Al layer exposed through openings of the resist pattern 150 are removed at one time with an etchant of a mixed acid prepared by mixing acetic acid, phosphoric acid, and nitric acid in water (see FIG. 9C). The resist pattern 150 is then removed with an alkaline remover (see FIG. 9D).

Figure 9F:
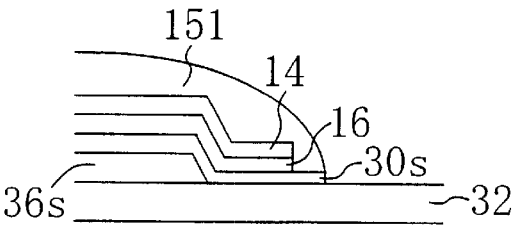
Figure 9G:
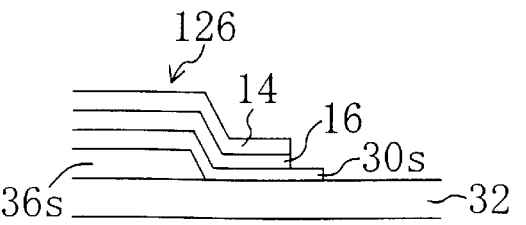

Thereafter, a resist is applied to substantially the entire surface of the resultant base substrate and patterned by photolithography to form a resist pattern 151 for patterning the ITO layer 130 (hereinafter, this resist pattern is also called a resist pattern for ITO patterning). The resist pattern 151 for ITO patterning covers the already-patterned Mo layer 16 and Al layer 14 so that the edge portions thereof are kept from being exposed (see FIG. 9E). Using the resist pattern 151 for ITO patterning as a mask, portions of the ITO layers 130 exposed through openings of the resist pattern 151 are removed with an etchant of a mixed solution of ferric chloride and hydrochloric acid (FIG. 9F). The resist pattern 151 is then removed with an alkaline remover. Thus, formed is the source electrode having a structure composed of the transparent conductive layer 30s, the Mo layer 16, and the Al layer 14 layered sequentially (see FIG. 9G).

Although not shown, together with the formation of the source electrodes, formed are the signal lines (source bus lines) having the structure composed of the source-side transparent conductive layer 30s, the Mo layer 16, and the Al layer 14 layered sequentially, and the drain electrodes having a structure composed of the drain-side transparent conductive layer 30d, the Mo layer 16, and the Al layer 14 layered sequentially. The portion of the drain-side transparent conductive layer 30d that is not covered with the Mo layer 16 and the Al layer 14 serves as a pixel electrode.

In this embodiment, the Al layer 14 is formed on the transparent conductive layer 30d via the Mo layer 16. Therefore, when part of the Al layer 14 formed on the transparent conductive layer 30d is removed for formation of a pixel electrode, it is possible to prevent occurrence of galvanic corrosion between ITO and Al due to an etchant or an alkaline developer or remover, and thus the transparent conductive layer 30d is prevented from being partially lost.

In the patterning process in this embodiment, the resist pattern 151 for ITO patterning covers the Mo layer 16 and the Al layer 14 so that the edge portions thereof are kept from being exposed. Therefore, the Mo layer 16 and the Al layer 14 will not be exposed to an etchant when the ITO layer 130 is etched, and thus the edge portions of the Mo layer 16 and the Al layer 14 will not be etched excessively in the direction of narrowing the line width of the layers from the edge of the resist pattern 151.

After the patterning process described above, a passivation layer 40 is deposited on the resultant base substrate, and patterned by photolithography, to obtain the TFT substrate 200a shown in FIG. 8. Using the three types of TFT substrates obtained in Examples 3 and 4 of this embodiment and Comparative Example 2, transmission type TN mode LCD devices (100 panels each) were fabricated by a known method. For each of Examples 3 and 4 and Comparative Example 2, the number of panels that had generated a break in a signal line was counted. Also, the number of luminescent spots per panel (pieces/panel) was calculated by summing the number of luminescent spots in all panels fabricated and then dividing the sum by 100. The results are shown in Table 3 below.

TABLE 3

| | Surface Grain size | Number of panels generating signal line break | Number of luminescent spots |
|---|---|---|---|
| Example 3 | 30 nm or less | 2 | 0.03 |
| Example 4 | 60 nm or less | 3 | 0.04 |
| Comparative Example 2 | 90 nm or less | 24 | 1.5 |

As for the LCD devices in Comparative Example 2, the cause for the generation of the breaks was examined. As a result, it was found that, for 19 panels, the cause was expansion of pinholes in the Al layer. In Comparative Example 2, the Mo layer of the signal line has a surface grain size of 90 nm or less, and therefore the Al layer formed on the Mo layer has a high number density of pinholes. Pinholes in the Al layer expand due to an etchant, an alkaline remover, or the like, and the expansion of pinholes causes partial loss of the Al layer and the Mo layer. When the number density of pinholes is high, the extent of the partial loss is great. For this reason, probably, breaks tend to be easily generated in Comparative Example 2.

On the contrary, in Examples 3 and 4, the Mo layer 16 has a surface grain size of 30 nm or less (Example 3) or 60 nm or less (Example 4), and therefore, the Al layer 14 formed on the Mo layer 16 has a low number density of pinholes. Since the number density of pinholes is low, the extent of partial loss of the Al layer 14 and the Mo layer 16 caused by the expansion of pinholes in the Al layer 14 is small. For this reason, probably, breaks are not easily generated. In this embodiment, the resist pattern removal with an alkaline remover is performed twice for the resist patterns 150 and 151. The Al layer 14 is therefore exposed to the alkaline remover for a prolonged period of time. That is, the patterning in this embodiment is performed under the condition that facilitates expansion of pinholes in the Al layer. Nevertheless, this embodiment can provide the effects that breaks are not easily generated and that the yield is improved.

In the concrete examples of this embodiment, the surface grain size of the Mo layer 16 was set at 30 nm or less (Example 3) or 60 nm or less (Example 4). Alternatively, the Mo layer 16 may be made of amorphous Mo, or may have the layered structure described in EMBODIMENT 1. In these alternatives, also the effects described above can be obtained. In this embodiment, the resist pattern 150 for Al/Mo patterning was removed with an alkaline remover immediately after the etching of the Mo layer 16 and the Al layer 14 (see FIG. 9D). Alternatively, the resist pattern 151 for ITO patterning may be formed and then the ITO layer 130 may be etched before removing the resist pattern 150. Thereafter, the resist patterns 150 and 151 may be removed simultaneously.

EMBODIMENT 4

The LCD device of EMBODIMENT 4 of the present invention is the same as the LCD device of EMBODIMENT 3 in construction, but different therefrom in the process of patterning to form the transparent conductive layers 30s and 30d, the Mo layer 16, and the Al layer 14. More specifically, after the ITO layer 130 is patterned, the Al/Mo double layers are deposited on the resultant transparent conductive layers 30s and 30d. Then, the Al/Mo double layers are patterned. Hereinafter, the patterning process in this embodiment will be described with reference to FIGS. 10A through 10F. The process until the deposition of the ITO layer 130 is the same as that in EMBODIMENT 3, and therefore description thereof is omitted here.

FIGS. 10A through 10F are schematic cross-sectional views for description of the patterning to form the source-side transparent conductive layer 30s, the Mo layer 16, and the Al layer 14 of the TFT 126 in this embodiment. First, a resist is applied to substantially the entire surface of the resultant base substrate, and a resist pattern 151 for ITO patterning is formed by photolithography (see FIG. 10B). Using the resist pattern 151 as a mask, portions of the ITO layer 130 exposed through openings of the resist pattern 151 are removed with an etchant of a mixed solution of ferric chloride and hydrochloric acid. The resist pattern 151 is then removed with an alkaline remover (see FIG. 10C).

Figure 10A:
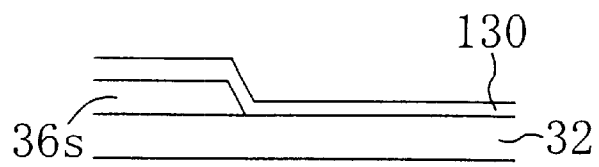
FIGS. 10A through 10F are schematic cross-sectional views for description of a patterning process for obtaining a source-side transparent conductive layer 30s, a Mo layer 16, and an Al layer 14 of a TFT 126 in EMBODIMENT 4.
Figure 10B:
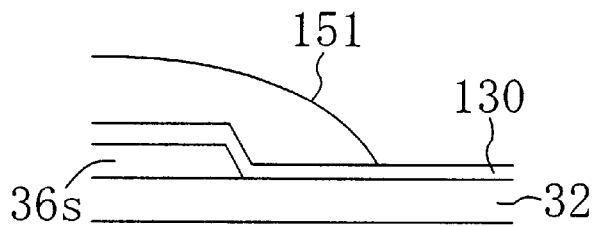
Figure 10C:
Figure 10D:
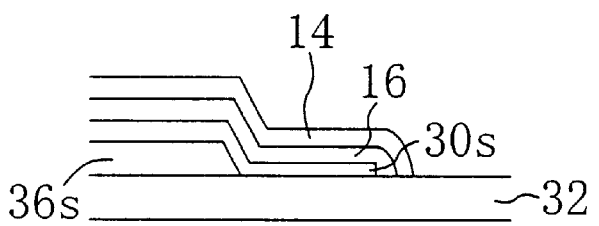
Figure 10E:
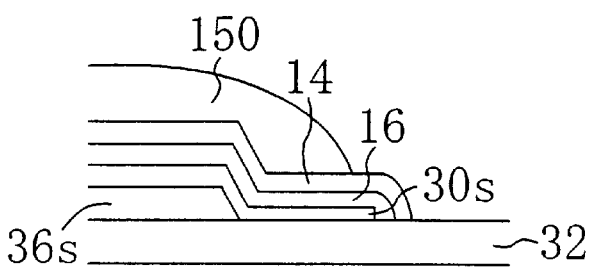
Figure 10F:
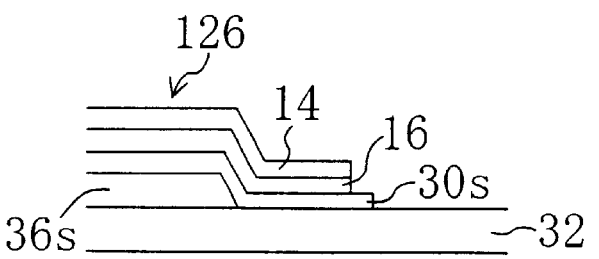

Thereafter, the Mo layer 16 and the Al layer 14 are sequentially formed by sputtering (see FIG. 10D). A resist is applied to the resultant base substrate and patterned by photolithography to form a resist pattern 150 for Al/Mo patterning (see FIG. 10E). Using the resist pattern 150 as a mask, the portions of the Mo layer 16 and Al layer 14 exposed through openings of the resist pattern 150 are removed at one time with an etchant of a mixed acid prepared by mixing acetic acid, phosphoric acid, and nitric acid in water. Since ITO as the material of the transparent conductive layer 30s is not easily dissolved in the mixed acid, the possibility of the transparent conductive layer 30s being narrowed or broken is low. After the patterning of the Al layer 14 and the Mo layer 16, the resist pattern 150 is removed with an alkaline remover (see FIG. 10F).

As in EMBODIMENT 3, using TFT substrates obtained in concrete examples of this embodiment, transmission type TN mode LCD devices were fabricated. For each of the fabricated LCD devices, the number of panels that had generated a break in a signal line was counted, and the number of luminescent spots per panel was calculated, as in EMBODIMENT 3. The results were the same as those obtained in EMBODIMENT 3.

In this embodiment, as in EMBODIMENT 3, the Mo layer 16 has a surface grain size of 60 nm or less, and therefore the Al layer 14 formed on the Mo layer 16 has a low number density of pinholes. Since the number density of pinholes is low, the extent of partial loss of the Al layer 14 and the Mo layer 16 caused by the expansion of pinholes in the Al layer 14 is small. For this reason, probably, breaks are not easily generated. In this embodiment, the resist pattern removal with an alkaline remover is performed twice for the resist patterns 150 and 151. The Al layer 14 is therefore exposed to the alkaline remover for a prolonged period of time. That is, the patterning in this embodiment is performed under the condition that facilitates expansion of pinholes in the Al layer. Nevertheless, this embodiment can provide the effects that breaks are not easily generated and that the yield is improved.

In EMBODIMENTS 3 and 4, the ITO layer 130 and the Al layer 14/Mo layer 16 were patterned in separate photolithographic processes and separate etching processes. However, separate patterning of the ITO layer 130 and the Al layer 14/Mo layer 16 is not a requisite in the method for fabricating a liquid crystal display device of the present invention. For example, in EMBODIMENT 3, after the formation of the resist pattern 150 for Al/Mo patterning and the etching with the mixed acid prepared by mixing acetic acid, phosphoric acid, and nitric acid in water, the next etching with the mixed solution of ferric chloride and hydrochloric acid may be performed without removing the resist pattern 150.

Figure 11:
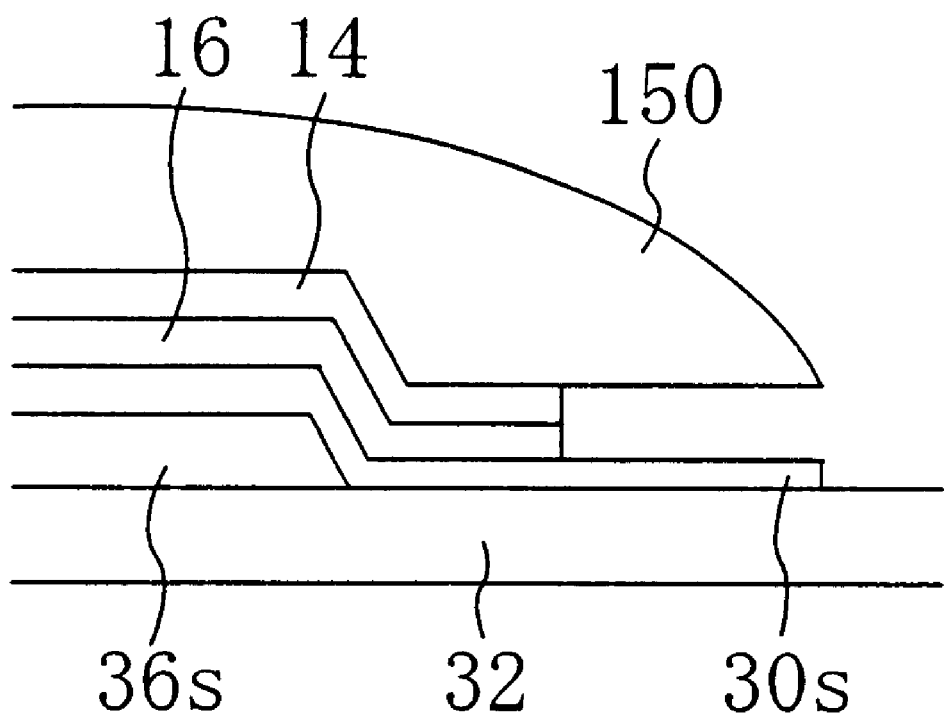
FIG. 11 is a schematic cross-sectional view illustrating the post-etching state of a source-side transparent conductive layer 30s, a Mo layer 16, and an Al layer 14 of a TFT 126 in another embodiment.

However, when immersed in the mixed solution of ferric chloride and hydrochloric acid, Al and Mo dissolve in the mixed solution at a rate higher than ITO (in particular, Mo dissolves at a considerably high rate). Therefore, side etching of the Al layer 14/Mo layer 16 is more vigorous than that of the ITO layer 130, possibly resulting in that the edges of the Al layer 14/Mo layer 16 noticeably retract as shown in FIG. 11. By this narrowing of the Al layer 14/Mo layer 16, it becomes difficult to control the source-drain distance and the line widths of bus lines and the like.

In EMBODIMENTS 3 and 4, the Al layer 14/Mo layer 16 are covered with the resist pattern 151 for ITO patterning, or the Al layer 14/Mo layer 16 are formed after the etching of the ITO layer 130. This prevents the Al layer 14/Mo layer 16 from being exposed to the mixed solution of ferric chloride and hydrochloric acid. In EMBODIMENTS 3 and 4, therefore, it is easy to control the source-drain distance and the line widths of bus lines and the like.

In EMBODIMENTS 1 and 2, the reflection type LCD device was used to describe embodiments of the present invention. The present invention is not limited to this type of LCD device, but can also be applied to a transmission/reflection type LCD device where part of a pixel electrode constitutes a reflection electrode (reflection layer) (see Japanese Laid-Open Patent Publication No. 11-101992). Also, the present invention is not limited to the active matrix LCD device using TFTs exemplified above, but can also be applied to an active matrix LCD device using MIM elements and a simple matrix LCD device. The display mode is not limited to the TN mode exemplified above, but it is possible to broadly adopt other known display modes that realize display by use of reflection light (for example, a light absorption mode such as a guest-host mode, a light scattering mode such as that used for a polymer diffusion LCD device, an ECB mode such as a super twisted nematic (STN) mode, and a ferroelectric liquid crystal mode).

In EMBODIMENTS 3 and 4, all of the signal line, the source electrode, and the drain electrode had the structure composed of the transparent conductive layer made of ITO, the Mo layer, and the Al layer layered sequentially. However, the present invention is applicable if at least one of the signal line, the source electrode, and the drain electrode has the three-layer structure of the Al layer/Mo layer/transparent conductive layer. In EMBODIMENTS 3 and 4, described was the transmission type LCD device including pixel electrodes formed on the gate insulating layer. The present invention is also applicable to a transmission type LCD device having a high aperture structure where a transparent organic insulating layer covering TFTs exists on a gate insulating layer, and pixel electrodes are formed on the organic insulating layer.

The wiring/electrode substrate of the present invention is also applicable to display devices other than liquid crystal display devices, such as display devices using organic EL. It is even applicable to solar batteries and the like. In organic EL display devices and solar batteries, a transparent conductive layer made of ITO is used as an electrode associated with control and use of light. In order to supplement the conductance of the transparent conductive layer, an Al or Al alloy layer is formed on a portion of the transparent conductive layer. According to the wiring/electrode substrate of the present invention, where interconnections or electrodes having the layered structure are formed on the substrate, the Al layer of the layered structure is prevented from being excessively narrowed or broken. Therefore, by adopting the wiring/electrode substrate of the present invention for organic EL display devices and solar batteries, it is possible to suppress/prevent reduction in the conductance of the interconnections or electrodes, and thus suppress generation of defect products.

Thus, according to the present invention, generation of pinholes in the Al layer formed on the Mo layer is suppressed/prevented. This suppresses/prevents generation of partial loss of the Al layer due to existence of pinholes in the Al layer. Since the Al layer serving as a reflection layer is suppressed/prevented from being partially lost during the fabrication process, it is possible to fabricate a liquid crystal display device having reflection characteristics as designed.

In addition, it is possible to suppress/prevent reduction in conductance or occurrence of a break in interconnections or electrodes having the three-layer structure of Al layer/Mo layer/transparent conductive layer. This provides the effect of suppressing generation of defect products and improving the yield.

Moreover, by adopting the Al layer/Mo layer double-layer structure according to the present invention, partial loss of an ITO layer due to galvanic corrosion between ITO and Al is prevented when an Al layer temporarily deposited on the ITO layer is removed. Accordingly, when an ITO layer is formed as the top layer of a terminal electrode, the ITO layer is suppressed/prevented from being partially lost when an Al layer temporarily deposited on the ITO layer is removed. Thus, a terminal electrode with high reliability can be formed.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A liquid crystal display device comprising a pair of substrates, a liquid crystal layer interposed between the pair of substrates, and a plurality of electrode pairs each facing each other via the liquid crystal layer, one of each pair of the plurality of electrode pairs being a reflection electrode for realizing display in a reflection mode, wherein the reflection electrode includes a first metal layer containing Mo and a second metal layer containing Al formed on the first metal layer, and the first metal layer is a crystal layer having a maximum grain size of crystal grains at a surface of 60 nm or less or an amorphous layer.

2. The device of claim 1, wherein the first metal layer is composed of Mo.

3. The device of claim 1, wherein part of the reflection electrode is formed on a transparent conductive layer made of ITO.

4. A method for fabricating a liquid crystal display device comprising a pair of substrates, a liquid crystal layer interposed between the pair of substrates, and a plurality of electrode pairs each facing each other via the liquid crystal layer, one of each pair of the plurality of electrode pairs being a reflection electrode for realizing display in a reflection mode, the reflection electrode being formed by a method comprising the steps of:

forming a first metal layer containing Mo on one of the substrates, the first metal layer being a crystal layer having a maximum grain size of crystal grains at a surface of 60 nm or less or an amorphous layer;

forming a second metal layer containing Al on the first metal layer; and patterning the first and second metal layers.

5. The method of claim 4, wherein the first metal layer is composed of Mo.

6. The method of claim 4, wherein the step of forming a first metal layer includes forming an amorphous first metal layer in an atmosphere containing nitrogen.

7. The method of claim 4, further comprising the step of forming a transparent conductive layer made of ITO on the substrate before the step of forming a first metal layer, wherein at least part of the first metal layer is formed on the transparent conductive layer.

8. The method of claim 4, wherein the density of pinholes formed in the second metal layer is 20 pcs./10000 $\mu m^2$ or less.

9. The method of claim 4, wherein the step of patterning the first and second metal layers includes the steps of:

forming a resist layer on the first and second metal layers;

exposing the resist layer to light;

forming a resist pattern having a predetermined pattern by developing the exposed resist layer with an alkaline developer;

patterning the first and second metal layers using the resist pattern as a mask; and removing the resist pattern with an alkaline remover.

10. The method of claim 4, wherein the step of patterning the first and second metal layers includes the step of etching at least one of the first and second metal layers.

11. The method of claim 4, wherein the step of patterning the first and second metal layers includes the step of wet-etching the first and second metal layers with a common etchant.

12. A method for fabricating a liquid crystal display device comprising a pair of substrates, a liquid crystal layer interposed between the pair of substrates, and a transparent conductive layer made of ITO formed on at least one of the pair of substrates, the method comprising the steps of:

forming the transparent conductive layer by a process of depositing an ITO layer on the at least one of the pair of substrates and patterning the ITO layer;

forming a first metal layer containing Mo on the ITO layer or the transparent conductive layer, the first metal layer being a crystal layer having a maximum grain size of crystal grains at a surface of 60 nm or less or an amorphous layer;

forming a second metal layer containing Al on the first metal layer; and patterning the first and second metal layers.

13. The method of claim 12, wherein the transparent conductive layer is formed as a top layer of a terminal electrode connected to an interconnection formed in a display area.

14. The method of claim 12, wherein the liquid crystal display device is a TFT active matrix liquid crystal display device, and at least one of a signal line, a source electrode, and a drain electrode has a structure including the transparent conductive layer, the first metal layer, and the second layer layered sequentially.

15. The method of claim 12, wherein the ITO layer is patterned by forming a resist pattern on the ITO layer and wet-etching the ITO layer using the resist pattern as a mask, and the first and second metal layers are patterned, separately from the patterning of the ITO layer, by forming a different resist pattern on the first and second metal layers and wet-etching the first and second metal layers using the different resist pattern as a mask.

16. A wiring substrate including interconnections or electrodes formed on a substrate, the interconnections or electrodes having a multilayer structure including a transparent conductive layer made of ITO, wherein the interconnections or electrodes include a first metal layer containing Mo formed on the transparent conductive layer and a second metal layer containing Al formed on the first metal layer, and the first metal layer is a crystal layer having a maximum grain size of crystal grains at a surface of 60 nm or less or an amorphous layer.

17. A method for fabricating a wiring substrate including interconnections or electrodes formed on a substrate, the interconnections or electrodes having a multilayer structure including a transparent conductive layer made of ITO, the method comprising the steps of:

forming the transparent conductive layer by a process of depositing an ITO layer on the substrate and patterning the ITO layer;

forming a first metal layer containing Mo on the ITO layer or the transparent conductive layer, the first metal layer being a crystal layer having a maximum grain size of crystal grains at a surface of 60 nm or less or an amorphous layer;

forming a second metal layer containing Al on the first metal layer; and patterning the first and second metal layers.

18. The method of claim 17, wherein the ITO layer is patterned by forming a resist pattern on the ITO layer and wet-etching the ITO layer using the resist pattern as a mask, and the first and second metal layers are patterned, separately from the patterning of the ITO layer, by forming a different resist pattern on the first and second metal layers and wet-etching the first and second metal layers using the different resist pattern as a mask.

19. A liquid crystal display device comprising:

a pair of substrates, a liquid crystal layer interposed between the pair of substrates, a reflection pixel electrode for providing display in a reflective mode, and another electrode on a side of the liquid crystal layer opposite the reflection pixel electrode, and wherein the reflection electrode includes a first metal layer containing Mo and a second metal layer containing Al formed on the first metal layer, and the first metal layer is a crystal layer having a maximum grain size of crystal grains at a surface of 60 nm or less, is an amorphous layer, or is partially a crystal layer having a maximum grain size of crystal grains at a surface of 60 nm or less and partially an amorphous layer.

20. A liquid crystal display comprising:

a liquid crystal layer provided between first and second substrates;

a pixel electrode comprising each of: a first layer comprising Mo and a second layer comprising Al, the second layer comprising Al being formed directly on at least a portion of the first layer comprising Mo; and wherein the first layer comprising Mo a maximum grain size of crystal grains at a surface thereof adjacent the second layer of 60 nm or less or is amorphous.

21. A liquid crystal display comprising:

a liquid crystal layer provided between first and second substrates;

a pixel electrode comprising each of: a first layer comprising Mo and a second layer comprising Al, the second layer comprising Al being formed directly on at least a portion of the first layer comprising Mo; and wherein the first layer comprising Mo has a maximum grain size of crystal grains at a surface thereof adjacent the second layer of 30 nm or less or is amorphous.

22. A liquid crystal display comprising:

a liquid crystal layer provided between first and second substrates;

a pixel electrode comprising each of: a first layer comprising Mo and a second layer comprising Al, the second layer comprising Al being formed directly on at least a portion of the first layer comprising Mo; and wherein the density of pinholes generated in the second layer comprising Al is 20 pcs./10,000 $\mu m^2$ or less.

* * * * *